US006690443B1

(12) United States Patent
Poliakine

(10) Patent No.: US 6,690,443 B1
(45) Date of Patent: Feb. 10, 2004

(54) MODULAR FRONT-LIT DISPLAY PANEL

(75) Inventor: Ran Poliakine, Mevaseret Zion (IL)

(73) Assignee: SixEye, Ltd., Mevaseret (IL)

( * ) Notice: Subject to any disclaimer, the term of this patent is extended or adjusted under 35 U.S.C. 154(b) by 0 days.

(21) Appl. No.: 09/381,818

(22) PCT Filed: Mar. 25, 1998

(86) PCT No.: PCT/IL98/00135
§ 371 (c)(1),
(2), (4) Date: Dec. 22, 1999

(87) PCT Pub. No.: WO98/43132
PCT Pub. Date: Oct. 1, 1998

(30) Foreign Application Priority Data

Mar. 25, 1997 (IL) .................................. 120529
Mar. 25, 1997 (IL) .................................. 120530

(51) Int. Cl.[7] ...................... G02F 1/1345; G02F 1/1333
(52) U.S. Cl. .......................................... 349/152; 349/58
(58) Field of Search ................... 349/106, 149, 349/152, 78, 79, 80, 108, 86, 88

(56) References Cited

U.S. PATENT DOCUMENTS

| 4,671,617 A | 6/1987 | Hara .......................... 349/195 |
| 5,142,644 A | 8/1992 | Vansteenkiste et al. ....... 349/86 |
| 5,194,973 A | 3/1993 | Isogai et al. .................. 349/10 |
| 5,384,067 A | 1/1995 | Doane et al. ................ 349/183 |
| 5,528,403 A | 6/1996 | Kawaguchi et al. ........ 349/149 |
| 5,541,749 A | 7/1996 | Konuma et al. ............. 349/106 |
| 5,729,313 A | 3/1998 | Mitsui et al. ................ 349/106 |
| 5,734,457 A | 3/1998 | Mitsui ........................ 349/106 |
| 5,737,040 A | 4/1998 | Ichikawa et al. ............... 349/9 |
| 5,760,862 A | 6/1998 | Bachus et al. ............... 349/149 |
| 6,067,134 A * | 5/2000 | Akiyama et al. .............. 349/74 |

FOREIGN PATENT DOCUMENTS

WO    WO 98/43132    * 10/1998

* cited by examiner

Primary Examiner—Toan Ton
Assistant Examiner—Dung Nguyen
(74) Attorney, Agent, or Firm—Kenyon & Kenyon

(57) ABSTRACT

A front-lit display panel includes a pixels units (10) attached to an assembly board at a plurality of pixel receiving positions arranged in a two-dimensional array. Each pixel unit has a layered structure including a sequence of a transparent conductor (20), an active layer (22) containing liquid-crystal-type molecules, and a rear conductive layer (24). Parts of the pixel unit (10) which lie on a side of the rear conductive layer (24) remote from the active layer (22) are designated as the "rear portion" of the pixel unit (10). Each pixel unit (10) also includes a first electrical connector (26) in electrical contact with the rear conductive layer (24) and a second electrical connector (28) in electrical contact with the transparent conductor (20). Both conductors (20, 24) extend to the rear portion of the pixel unit (10). Each pixel receiving position on the assembly board is provided with a pair of contacts adapted for making electrical contact with the first and second electrical connectors (26, 28) of one of the pixel units (10).

20 Claims, 8 Drawing Sheets

MODULAR FRONT-LIT DISPLAY PANEL

FIELD AND BACKGROUND OF THE INVENTION

The present invention relates to display panels and, in particular, it concerns dynamically controlled front-lit display panels based on liquid crystal technology.

It is known to employ liquid crystal technology for display panels. Typically, such panels are of back-lit designs in which the display is generated by controlling the amount of active rear illumination reaching the eye of a viewer. Display panels of this type are difficult to view under bright ambient lighting conditions when levels of reflected light am typically equal to, or greater than, the active display illumination, In an attempt to produce a display screen which may be used under bright ambient lighting conditions, front-lit reflective displays have been developed. An example of such a display is disclosed in U.S. Pat. No. 5,541,749 to Konuma et al. which is hereby incorporated by reference as if set out filly herein. Displays of the reflective type operate by modulating the state of a liquid crystal layer so as to vary its reflectivity. Thus, in the case of polymer-dispersed liquid crystal (PDLC), the layer can be varied from highly reflective milky-white dispersive state to a clear transmissive state. By placing colored or black layers behind a pixel, it is possible to vary the pixel from white to a colored or black appearance.

Some conventional PDLC technology suffers from an inability to produce dark colors or high contrast. Since each pixel switches between a white maximum reflectivity state and a colored minimum reflectivity state, the display produces a range of pastel colors which contain a large admixture of white. The available contrast can be somewhat enhanced by the provision of pixels with black backing, but the darkest effect available still includes a combination of colors reflected from all the colored pixels, producing an off-white effect.

Further problems are posed by the need for independent electrical control over each pixel of a reflective display screen. Thus, for example, the design of Konuma et al. resorts to a complicated arrangement of thin film transistors for switching the light-modulating layer. Such complicated designs are also typically unsuitable for large scale applications such as outdoor display panels for advertising and the like.

U.S. Pat. No. 5,384.067 to Doane et al. discloses a light-modulating device based on a polymer stabilized chiral nematic liquid crystal material. By applying suitable pulses of an electric field, the device can be adjusted to a stable state in the continuum between a substantially transparent state and a reflective state. The reflective state selectively reflects a given color the wavelength of which is fixed by the pitch length of the liquid crystal. The pitch length, in turn, is fixed by the proportions of nematic liquid crystal and chiral material which are used. The aforementioned patent is hereby incorporated by reference as if fully set out herein.

Advances have also recently been made in development of surface stabilized cholesteric liquid crystal which has similar optical properties to the polymer stabilized chiral material but has advantages in its production process. This technology is described in an article by Z. J. Lu et al. (1995 SID Proc., pp. 172–175) which is hereby incorporated by reference as if fully set out herein.

Practical instructions for producing both polymer stabilized and surface stabilized liquid crystal cells of different colors are given in a brochure entitled "Merck Liquid Crystals—Licrilite®" (Version 4, Dec. 1995), available from Merck Ltd., England. The materials required are commercially available from the same source.

Other recent developments have achieved similar functionality using PDLC materials by introducing dichroic dyes into the liquid crystal droplets. Since the optical path of light through the PDLC layer is very much greater in the scattering state than in the clear state, the overall effect is of a colored scattering state while the transparent state remains almost uncolored.

There is therefore a need for a front-lit display panel which is simple in structure, easy to produce, provides high contrast and dark color capabilities, and is suitable for large scale applications.

SUMMARY OF THE INVENTION

The present invention is a front-lit display panel assembled from a plurality of independent pixel units.

According to the teachings of the present invention there is provided, a front-lit display panel comprising: (a) a plurality of pixels units, each pixel unit having: (i) a layered structure including a sequence of: a transparent conductor, an active layer containing liquid-crystal-type molecules, and a rear conductive layer, parts of the pixel unit which lie on a side of the rear conductive layer remote from the active layer being designated as the "rear portion" of the pixel unit, (ii) a first electrical connector in electrical contact with the rear conductive layer and extending to the rear portion of the pixel unit, and (iii) a second electrical connector in electrical contact with the transparent conductor and extending to the rear portion of the pixel unit; and (b) an assembly board for receiving the plurality of pixel units at a plurality of pixel receiving positions arranged in a two-dimensional array, each pixel receiving position having at least two contacts adapted for making electrical contact with the first and second electrical connectors of one of the pixel units.

According to a further feature of the present invention, the active layer contains a colored dye.

According to a further feature of the present invention, there is provided a colored filter positioned in front of the transparent conductor.

According to a further feature of the present invention, the active layer includes either PDLC or chiral nematic liquid crystal material.

According to a further feature of the present invention, the assembly board has a plurality of sockets, one of the sockets being located at each of the pixel receiving positions, and wherein the rear portion of each pixel unit includes a projection shaped for engaging one of the sockets.

According to a further feature of the present invention, the first and second connectors include connecting strips associated with at least one external surface of the protection.

According to a further feature of the present invention, the rear conductive layer is transparent, and wherein the rear portion of the pixel unit includes black backing material.

According to a further feature of the present invention, the plurality of pixel units includes a first group of pixel units in which the active layer assumes a relatively high reflectivity state in which a first color is reflected, a second group of pixel units in which the active layer assumes a relatively high reflectivity state in which a second color is reflected, and a third group of pixel units in which the active layer assumes a relatively high reflectivity state in which a third color is reflected.

According to a further feature of the present invention, one of the transparent conductor and the rear conductive layer is subdivided into a plurality of discontinuous regions, each of the regions being provided with a separate electrical connector in electrical contact with the region and extending to the rear portion of the pixel unit.

According to a further feature of the present invention, the regions are arranged in a two dimensional array, one of the dimensions corresponding to two of the regions.

According to a further feature of the present invention, the layered structure of each of the pixels further includes: (a) an intermediate transparent conductor and a second active layer containing liquid-crystal-type molecules, the intermediate transparent conductor and the second active layer being located between the first-mentioned active layer and the rear conductive layer, and (b) a third electrical connector in electrical contact with the intermediate transparent conductor and extending to the rear portion of the pixel unit.

There is also provided according to a further feature of the present invention, a front-lit color display panel comprising a plurality of pixels units, each pixel unit having a layered structure including a sequence of: a transparent conductor, an active layer containing stabilized chiral nematic liquid crystal, and a rear conductive layer, and wherein the plurality of pixel units includes a first group of pixel units in which the stabilized chiral nematic liquid crystal assumes a reflective state in which a first color is reflected, a second group of pixel units in, which the stabilized chiral nematic liquid crystal assumes a reflective state in which a second color is reflected, and a third group of pixel units in which the stabilized chiral nematic liquid crystal assumes a reflective state in which a third color is reflected.

According to a filer feature of the present invention, the rear conductive layer is transparent, and wherein the rear portion of the pixel unit includes black backing material.

According to a further feature of the present invention, one of the transparent conductor and the rear conductive layer is subdivided into a plurality of discontinuous regions, each of the regions being provided with a separate electrical connector in electrical contact with the region and extending to the rear portion of the pixel unit.

According to a Firer feature of the present invention, the pixel units are arranged such that each of the regions of a pixel unit of the first group is adjacent to one of the regions of a pixel unit from each of the second and third groups.

There is also provided according to a further feature of the present invention, a front-lit color display panel comprising a plurality of pixels units, each pixel unit having a layered structure including a sequence of: a filter, a transparent conductor, an active layer containing liquid-crystal-type molecules, and a rear conductive layer, and wherein the plurality of pixel units includes a first group of pixel units in which the filter is selectively transparent to a first color, a second group of pixel units in which the filter is selectively transparent to a second color, and a third group of pixel units in which the filter is selectively transparent to a third color.

There is also provided according to a further feature of the present invention, a front-lit color display panel comprising a plurality of pixels units, each pixel unit having a layered structure including a sequence of: a transparent conductor, an active layer containing liquid-crystal-type molecules and a dye, and a rear conductive layer, and wherein the plurality of pixel units includes a first group of pixel units in which the dye produces a reflective state in which a first color is reflected, a second group of pixel units in which the dye produces a reflective state in which a second color is reflected, and a third group of pixel units in which the dye produces a reflective state in which a third color is reflected.

There is also provided according to a further feature of the present invention, a front-lit display comprising a layered structure including a sequence of: a transparent conductor, a first active layer containing liquid-crystal-type molecules, an intermediate transparent conductor, a second active layer containing liquid-crystal-type molecules, and a rear conductor assembly including a mirror element.

According to a further feature of the present invention, the second active layer assumes a substantially black scattering state.

BRIEF DESCRIPTION OF THE DRAWINGS

The invention is herein described, by way of example only, with reference to the accompanying drawings, wherein:

FIG. 13 is a second transverse cross-sectional view through the pixel unit of FIG. 10 perpendicular to the view of FIG. 11A;

DESCRIPTION OF THE PREFERRED EMBODIMENTS

The present invention is a front-lit display panel assembled from a plurality of independent pixel units.

The principles and operation of display panels according to the present invention may be better understood with reference to the drawings and the accompanying description.

Figure 1:
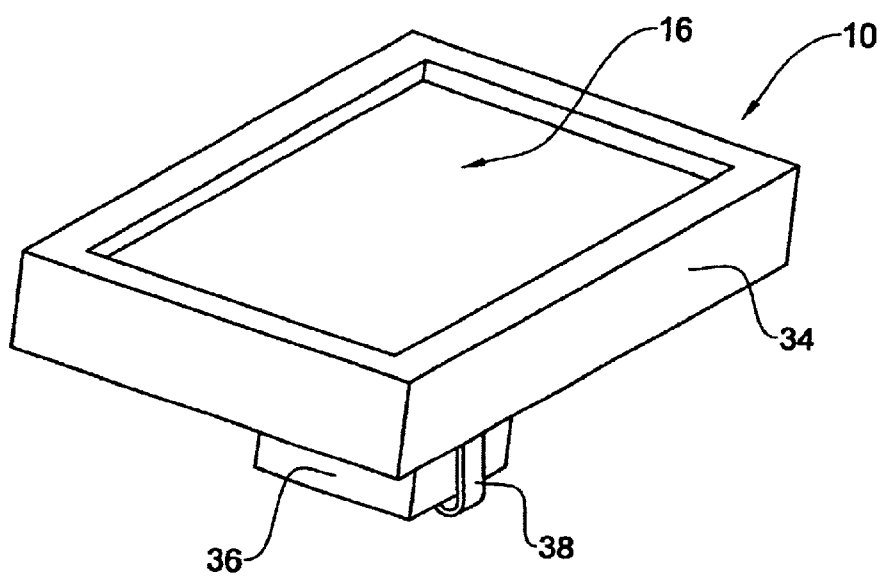
FIG. 1 is a perspective view of the front of a pixel unit for use in a display panel, constructed and operative according to the teachings of the present invention.
Figure 2:
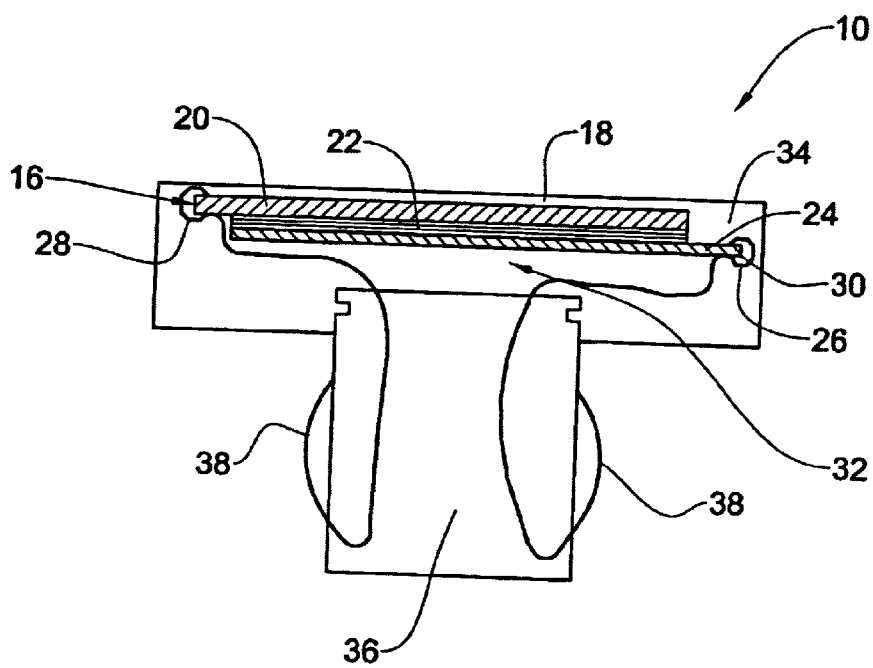
FIG. 2 is a cross-sectional view of the pixel of FIG. 1.
Figure 3:
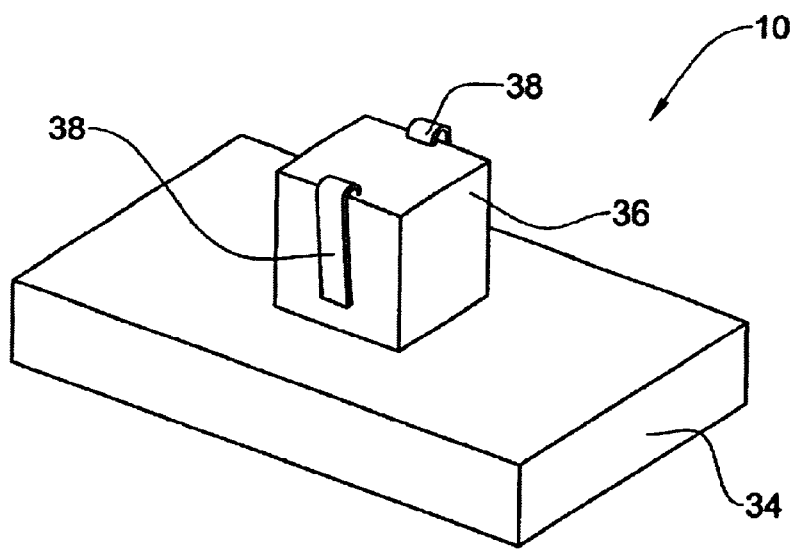
FIG. 3 is a perspective view of the rear of the pixel of FIG. 1.

Referring now to the drawings, FIGS. 1–3 show a pixel unit 10 which is used together with an assembly board 12 (FIG. 4) to form a front-lit display panel, generally designated 14 (FIGS. 5 and 6), constructed and operative according to the teachings or the present invention. The use of individual pixel units mounted on a common assembly board allows connections to a liquid crystal shutter within each pixel to be made simply by connectors passing around the periphery of the shutter to the rear portion of the pixel.

It should be noted that, while the present invention will be described herein with reference to a preferred embodiment which is described as a "front-lit" display panel, the invention may also be applied to a display which has rear illumination. The structural adaptation required to convert the disclosed embodiment to a back-lit implementation will be readily understood by one ordinarily skilled in the art.

A preferred embodiment of pixel unit 10 will now be described with reference to FIGS. 1–3. Generally speaking, each pixel unit 10 includes a layered structure 16 including a sequence of: a transparent substrate 18, a transparent conductor 20, an active layer 22 containing liquid-crystal-type molecules, and a rear conductive layer 24. A first electrical connector 26 is positioned in electrical contact with rear conductive layer 24, and a second electrical connector 28 is positioned in electrical contact with transparent conductor 20. Second electrical connector 28 extends from transparent conductor 20 around part of the peripheral edge of layered structure 16 to provide contacts in the rear portion of pixel unit 10.

Turning to layered structure 16 in more detail, transparent substrate 18 is generally a glass or plastic layer on to which transparent conductor 20 is applied as a coating. The most common choice for the transparent conductor itself is indium tin oxide (ITO). However, it should be emphasized that these materials may be substituted by a range of other materials known in the art for providing transparent electrode structures. In certain cases, conductor 20 may be implemented as a layer of conductive plastic or the like, sufficiently strong to allow omission of substrate 18. As a further alternative, the "transparent" electrode may be implemented as a metallic mesh or net sufficiently fine to allow in excess of 80%, and preferably in excess of 90 or 95%, of the light to pass through. For the purposes of the present invention, such a structure will also be termed "transparent" in the sense that it allows light to pass through. The term "transparent" further does not exclude the possibility of wavelength-dependent transparency, such as in a color filter.

Active layer 22 is described as "containing liquid-crystal-type molecules". This phrase is used herein in the description and claims to refer to any material for which the optical properties change due to alignment of molecules with an applied electric field More specifically, it is intended to refer to a class of materials in which the degree of reflectivity for at least some wavelength of visible light may be varied by changing an applied electric field without requiring the use of polarizers. Typical examples of such materials include, but are not limited to, polymer dispersed liquid crystal (PDLC) materials and stabilized chiral nematic liquid crystal maternal.

It should be understood that the present invention may be implemented in numerous forms employing different types of materials containing liquid-crystal-type molecules. The details of each implementation will differ according to the properties of the materials used in two main respects. Firstly, the different physical properties require different control voltages as will be abundantly clear to one ordinarily skilled in the art. For example, PDLC is activated by application of an AC field which must be maintained for as long as the material is to be kept clear whereas stabilized chiral nematic liquid crystal materials assume steady states which are switched by application of a transient pulsed field Secondly, and more importantly, the optical properties of different materials lend themselves to different approaches for achieving an effective high-contrast and/or vivid color display. A number of specific examples will now be described.

In the case of PDLC, the two extreme optical states are normally an opaque scattering state in which the material has a milky white appearance with relatively high reflectivity and a substantially transparent low-reflectivity state. Thus, if a colored or black surface is positioned behind such a layer, the device can be used to switch between white and a color or black. If, in addition to a black backing, a colored filter is applied to the front surface, the device can switch between a colored state and black. A similar effect can be obtained without a filter by adding dye into the PDLC material itself, within either or both of the liquid crystal material and the polymer matrix.

In the case of stabilized chiral nematic liquid crystal material, each cell has a reflective state of a given color. In this case, pixel units 10 are preferably produced with active layer 22 corresponding to one of three primary colors or their complementary colors. The composition and production of the material will be readily understood by one ordinarily skilled in the art from the description and examples of the above-referenced brochure of Merck Ltd. and the other references which have been incorporated herein by reference.

It should be noted in this context that the phrase "stabilized chiral nematic liquid crystal" is used herein in the specification and claims to include any and all materials having the properties associated with such materials, even if their chemical nature should vary somewhat from the strict interpretation of the words.

As mentioned earlier, any of the above implementations may be adapted within the scope of one ordinarily skilled in the art for rear-illuminated applications.

Rear conductive layer 24 is most simply implemented as a solid electrode of an appropriate color (as will be discussed below), and with appropriately selected reflectivity. In a preferred embodiment, layered structure 16 is designed as a color-independent unit with a substantially transparent minimum reflectance state. The layered structure is then positioned in front of a suitably colored and/or reflective backing material 32, as will be described. Thus, in the preferred embodiment shown, rear conductive layer 24 is implemented as a second transparent layer attached to a rear transparent substrate 30. Rear conductive layer 24 and rear transparent substrate 30 are typically equivalent to the combination of transparent substrate 18 and transparent conductor 20, in reversed order. Here too, conductive layer 24 and substrate 30 may be implemented in any of the alternative forms mentioned above in the context of transparent substrate 18 and transparent conductor 20. Conductive layer 24, substrate 30 and backing material 32, or any of the alternative structures for accomplishing an equivalent function, are referred to generically as a "rear conductor assembly".

As already mentioned, the choice of backing material color depends on the details of a particular implementation. For an active layer with a transparent low-reflectivity state, a colored or black effect can be achieved by use of colored or black backing material 32, respectively, to the rear of transparent conductor 20. In other applications, a highly reflective or mirror-like backing may be used. Backing material 32 may be a localized layer positioned behind layered structure 16, or may be an integral part of the pixel housing 34 produced, for example, from suitably colored plastic material. Housing 34 typically extends around the entire periphery of layered structure 16, thereby unifying the pixel structure. The peripheral parts of housing 34 visible from the front of the pixel unit preferably form a minor proportion of the front surface area, and typically no more than about 5%. In the certain cases, it may be preferable that the visible peripheral parts of the housing are black so that they do not contribute significantly to the reflection reaching the eyes of an observer.

In order to facilitate forming connections with transparent conductor 20 and rear conductive layer 24, the layers, together with their substrates, are preferably attached with slight lateral overhang or overlapping. This leaves part of each conductive layer exposed for attachment of connectors 26 and 28. The overhang may be generated by asymmetric attachment of similar layers, or by use of non-identical layers. In the latter case, the overhang may be along two adjacent sides of layered structure 16.

Connectors 26 and 28 may be any type of direct electrical connection from rear conductive layer 24 and conductor 20, respectively, passing around the periphery of layered structure 16 to the rear part of pixel 10 where they provide contacts configured for electrical connection to an assembly board. In this context, it should be noted that the phrase "rear part" of the pixel are used herein in the specification and claims to refer to all parts of the pixel lying rearward of the plane of rear conductive layer 24. The fact that the pixel structure of the present invention provides both electrical contacts for control of the pixel within the car part of the pixel provides profound advantages of structural simplicity and adaptability to large scale applications over the prior art structures described above.

The contacts may be individual contact pins projecting from the rear of pixel 10. In a preferred embodiment, as shown, housing 34 is formed with a rearward-projection 36 for engaging a pixel receiving socket in assembly board 12.

In this case, the contacts of connectors 26 and 28 are preferably implemented as outwardly-sprung connector strips 38 provided on the outer surface of projection 36.

It will be appreciated that the size of pixel unit 10 can vary according to the scale of the intended application. For a typical display board of about 3 m×4 m, the dimensions of each pixel unit would typically be chosen to be about 5 mm×5 mm to construct a display of about 600×800 pixels. For a color display, three or four adjacent pixel units of different colors function together as a compound, color pixel unit. Clearly, the pixel size can be varied according to the required display dimensions and resolution. For example, scaled-up pixel units of dimensions as great as several centimeters across can be used to construct lower resolution and/or very large displays suitable for use in sports stadiums and other applications viewed from a large distance. In particularly large displays, the total display is typically made up from a number of separate displays positioned together or attached to one another to form a larger array.

Figure 4:
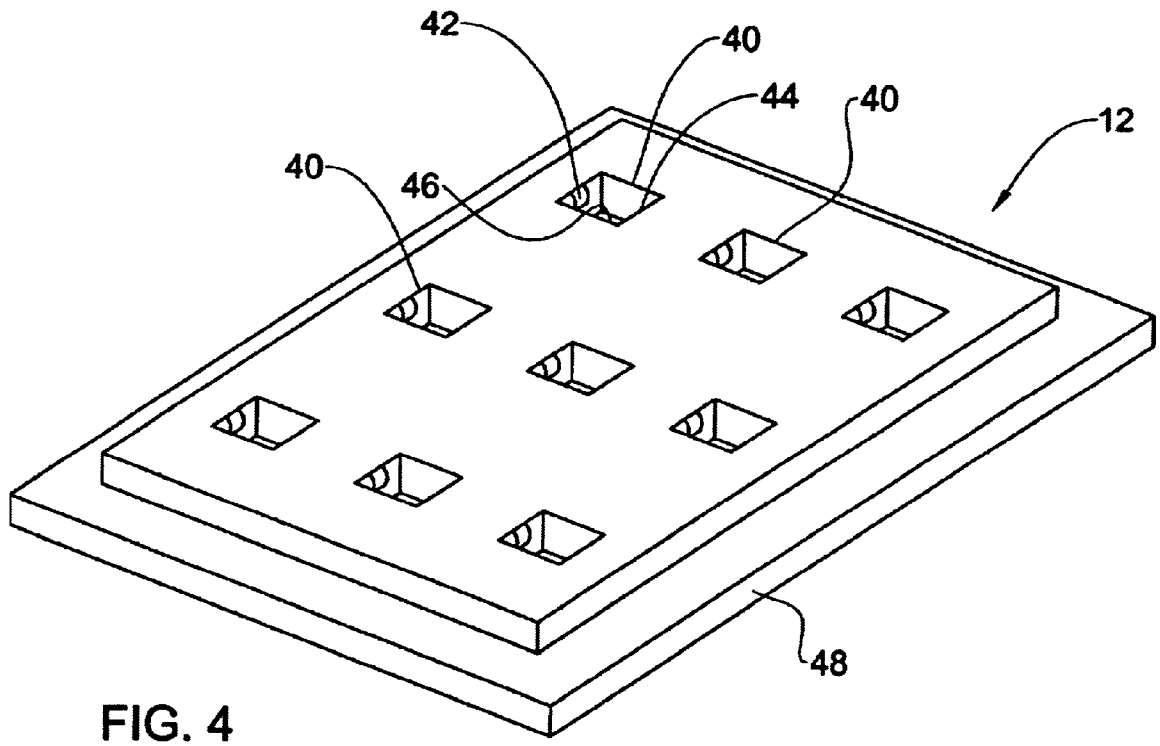
FIG. 4 is a perspective view of an assembly board for use in a display panel, constructed and operative according to the teachings of the present invention.

Turning to FIG. 4, the details of assembly board 12 will now be described. Assembly board 12 has a plurality of pixel receiving positions 40 arranged in a two-dimensional, typically rectangular, array. Each pixel receiving position 40 has at least two contacts 42 and 44 adapted for making electrical contact with the contacts of connectors 26 and 28 of one pixel unit. In a preferred embodiment, each pixel receiving position 40 is provided with a socket 46 for mating with projection 36 to facilitate precise positioning and attachment of pixel units 10 to assembly board 12. In this case, contacts 42 and 44 are positioned to abut connector strips 38.

Assembly board 12 also features a base layer 48 which contains all the electrical connections for operation of display panel 14. Typically, one of contacts 42 and 44 is connected as a common connection for all pixel units, while the other contact is individually controlled by conventional multiplexing techniques. The characteristics of the control voltages required are determined by the exact characteristics of the active layer used in the pixels, as is known in the at It should be noted that the embodiment of assembly board 12 described here is one of a large number of possible variations within the scope of the present invention. Specifically, connection of the pixel units to the assembly board can be achieved by a wide range of techniques known in the field of electronic component assembly. Examples include, but are not limited to, positioning directly over pre-soldered contact points of a printed circuit board followed by a self-soldering baking process, wavesoldering or any other soldering process. In this context, it should be noted that assembly board 12 does not necessarily include an interface board as distinct from the layer containing the electronics of the display.

Figure 5:
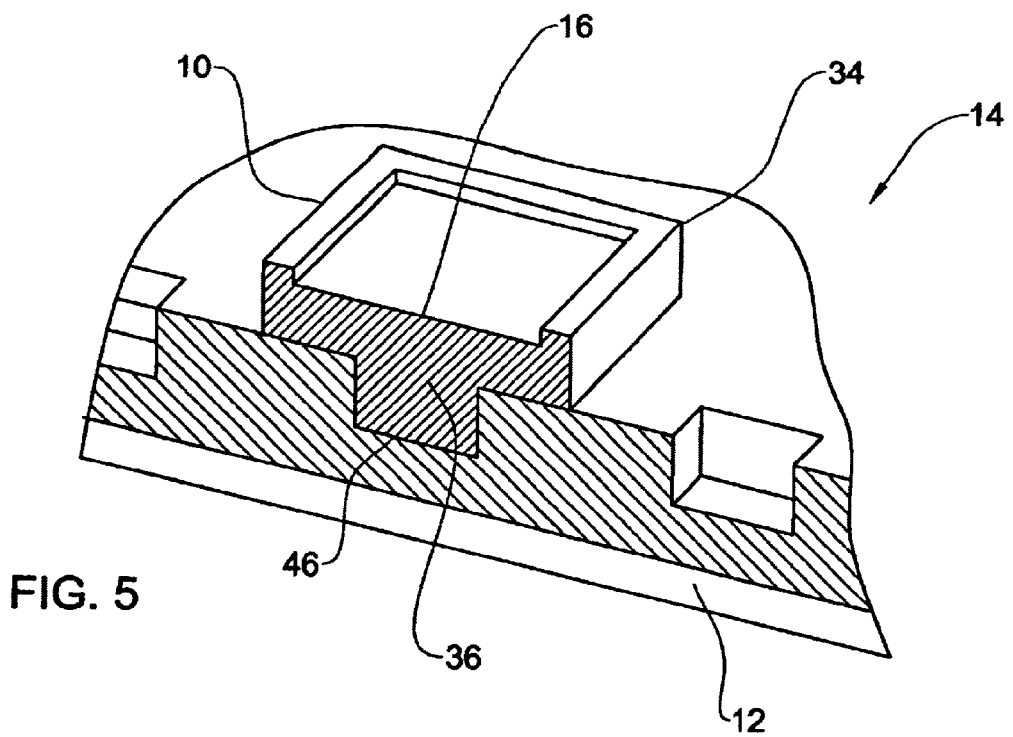
FIG. 5 is a cut-away perspective view of a display panel constructed and operative according to the teachings of the present invention, in which the pixel unit of FIG. 1 is attached to the assembly board of FIG. 4.
Figure 6:
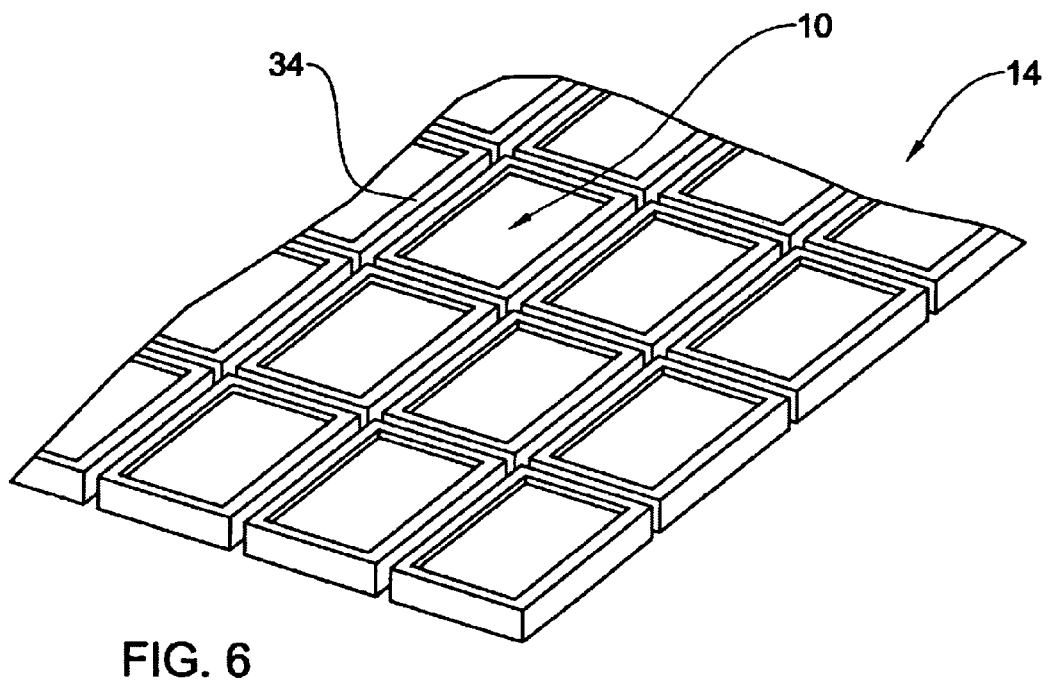
FIG. 6 is a perspective view of the display panel of FIG. 5.

The assembled display panel structure 14 is shown in FIGS. 5 and 6. Each pixel unit 10 is precisely positioned in one pixel receiving position 40 so as to form the appropriate electrical connections. Once assembled, each pixel can be individually controlled, generally in a continuous manner, between a high reflectivity state and a lower reflectivity state. If all pixel units 10 are made the same color, the result is a highly controllable monochrome screen. In a preferred color embodiment, three groups of pixel units are each adjustable between a different color and either white or preferably black. The three colors may be may be any combination, such as reds green and blue (RGB), which can be used together to generate a full range of perceived colors. In the case that the non-colored state of each pixel is a high reflectivity white state (for example, in a basic PDLC implementation), it may also be desirable to include a fourth group of pixel units having black backing material 32. This provides additional capability of increasing the contrast of the display. The three or four groups of pixels arc arranged in an interspersed pattern such that by providing localized combinations of the different colors, a wide range of color effects can be achieved in a manner well known in the art.

It will be appreciated that, by employing a number of independent pixel units 10 as disclosed, the electrical control of each pixel is achieved simply and without requiring the addition of any complex transparent components to layered structure 16. This reduces production costs of display 14 while simultaneously improving reliability.

Figure 7:
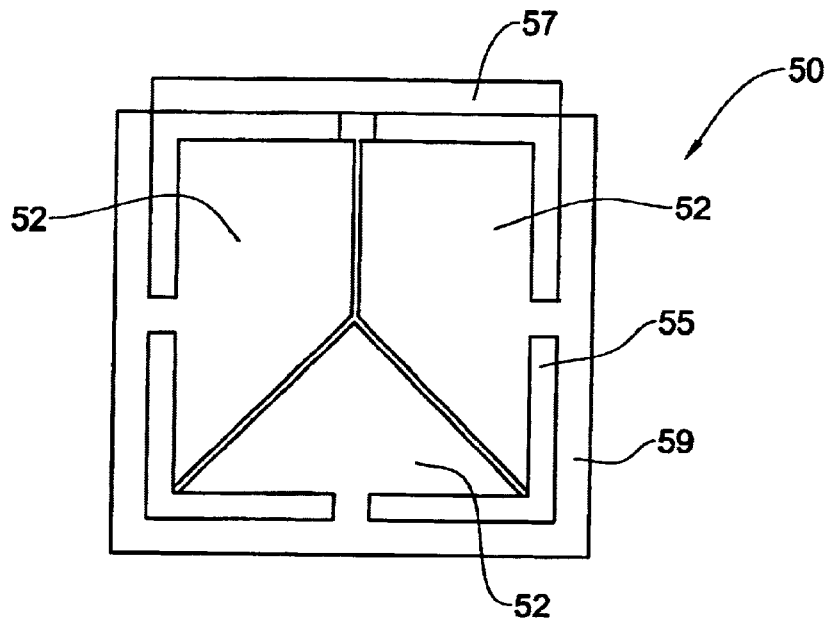
FIG. 7 is a front view of a sub-divided pixel unit, constructed and operative according to the teachings of the present invention.
Figure 8A:
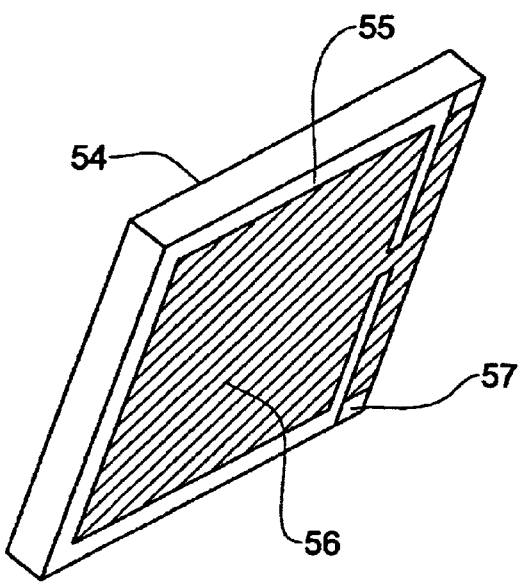
FIGS. 8A and 8B are perspective views of component layers of the pixel unit of FIG. 7.
Figure 8B:
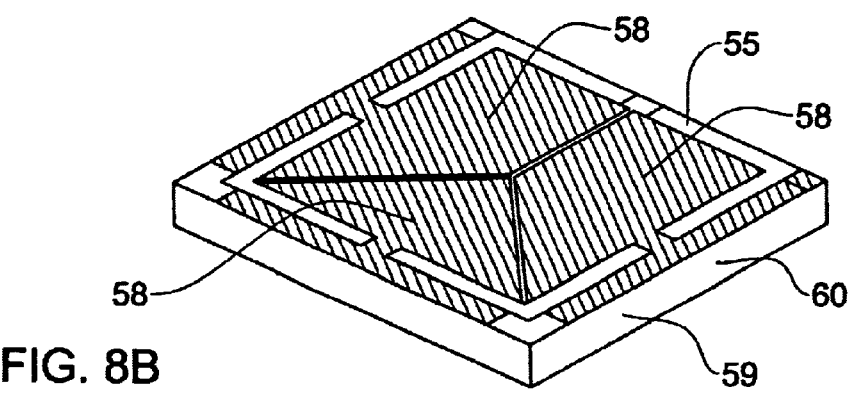

Turning now to FIGS. 7–9, it should be noted that the pixel units of the present invention are not limited to a single indivisible cell. Accordingly, FIG. 7 shows the layered structure of a pixel unit, generally designated 50, constructed and operative according to the teachings of the present invention, which is sub-divided into a number of individually controllable cells 52. Cells 52 are arranged in a one- or two-dimensional array or group. A sealing strip 55 extends around the periphery of the active region of the unit with the exception of connection gaps, as is known in the art. On one transparent substrate 54, shown more clearly in FIG.

8A, is a continuous layer 56 of transparent conductor forming a common electrical connection for all of cells 52. An overhanging flange 57 is provided with an extension of layer 56 for forming an electrical connection. The second transparent conductor (FIG. 8B) is formed as a pattern of isolated regions 58, each corresponding to one of cells 52, on a second transparent substrate 60. Regions 58 may be formed by etching, printing or other techniques known in the art Separate electrical connections are provided to each region 58 through a peripheral overhang strip 59, thereby generating a set of independently controllable cells within pixel unit 50.

It is a particular feature of certain preferred embodiments of pixel unit 50 that the array of cells has one dimension no greater than two cells across. Transparent substrate 60 preferably overhangs transparent substrate 54 in that dimension so as to expose part of each conductor region 58 for electrical connection in a manner similar to that described above. This structural requirement ensures that electrical control of every cell 52 can be achieved directly by a simple electrical connection running to the rear part of pixel unit 50.

For implementations in which color is provided either by colored rear backing or by superimposed front filters, a colored pixel unit can be constructed by providing filters or backing material having a corresponding array of colored regions. In this case, each pixel unit preferably has an even balance of types of color cells (e.g. 2×RGB) so that a color display can be built-up from a plurality of identical pixel units. An example of a rectangular 2×3 cell pixel unit 64 of this type is shown in FIG. 9B.

For implementations in which color is generated by the composition of the active layer itself such as in dye-containing PDLC or chiral nematic liquid crystal, an alternative solution is required. Since the entirety of each pixel unit 50 is most conveniently filled with a single composition, all of cells 52 for a given pixel unit typically have a single color. In a color display, the full potential resolution of pixel units 50 can be exploited by arranging units of different colors alongside each other in such a way that a "functional color pixel" can be defined as a group of single cells 52 from three adjacent pixel units 50 of different colors. Clearly, this solution could also be used if the color is provided by colored rear backing or superimposed front filters.

Figure 9A:
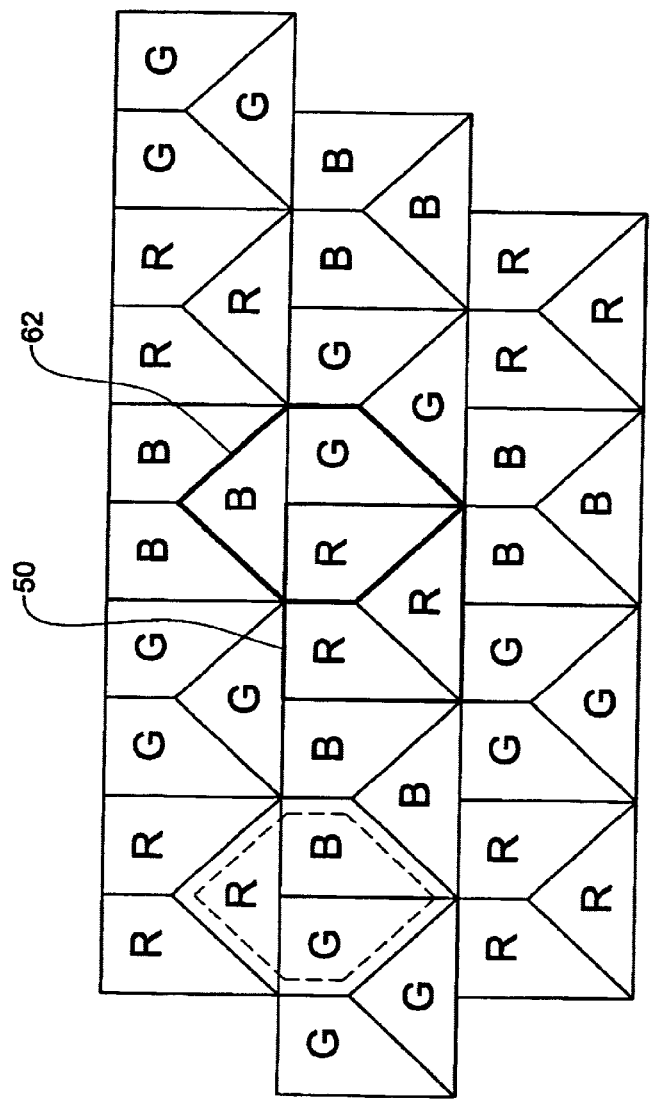
FIG. 9A is a front view of a display panel, constructed and operative according to the teachings of the present invention, employing the pixel unit of FIG. 7.
Figure 9B:
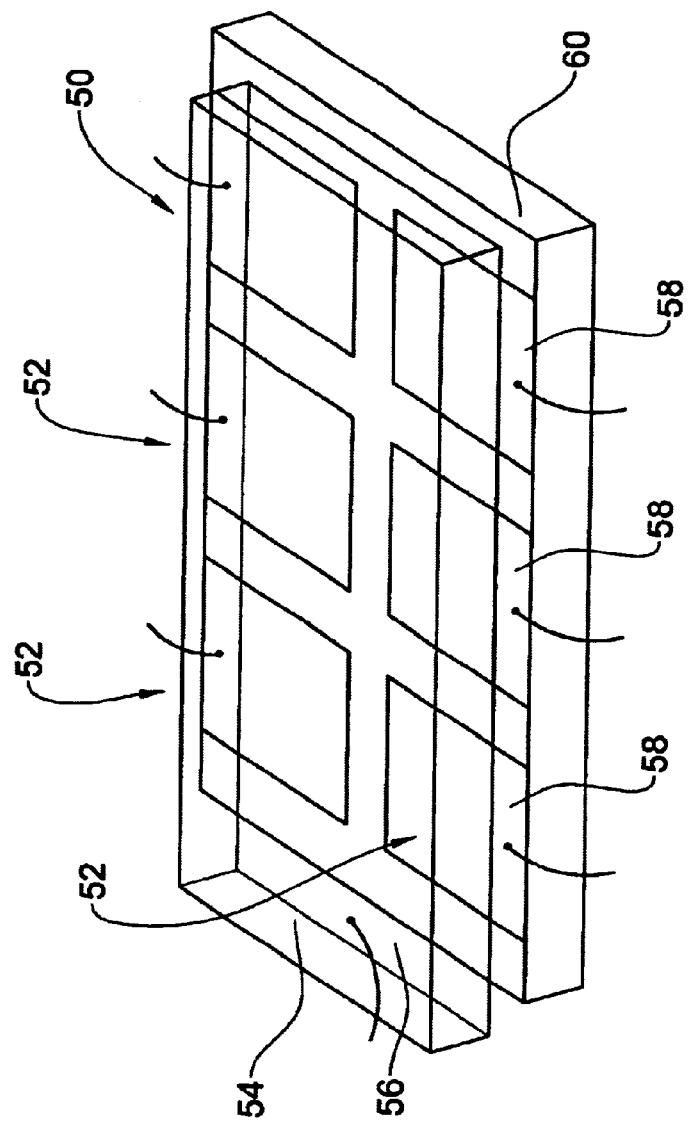
FIG. 9B is a schematic isometric view of the layered structure from a multiple cell pixel unit, constructed and operative according to the teachings of the present invention.
Figure 11A:
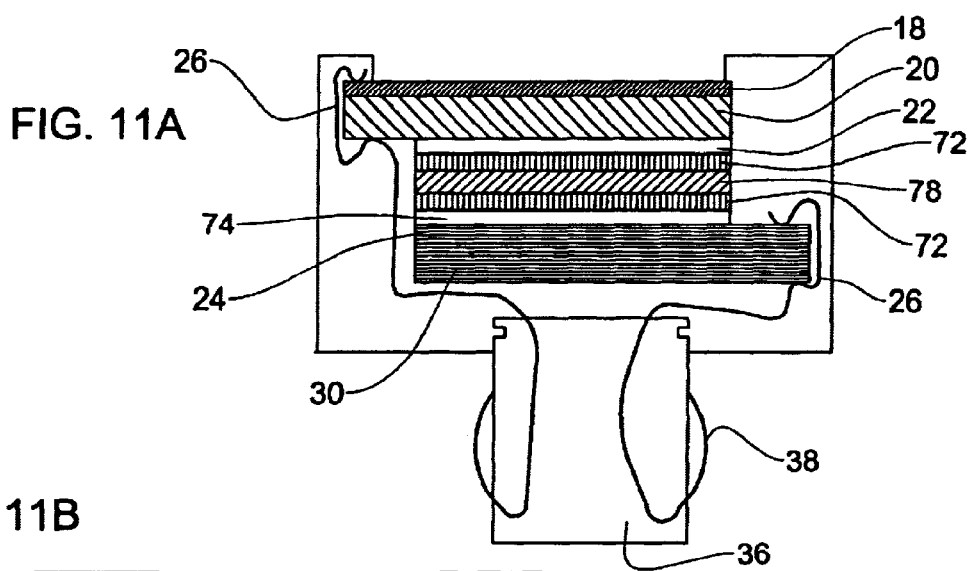
FIG. 11A is a first transverse cross-sectional view through the pixel unit of FIG. 10.
Figure 11B:
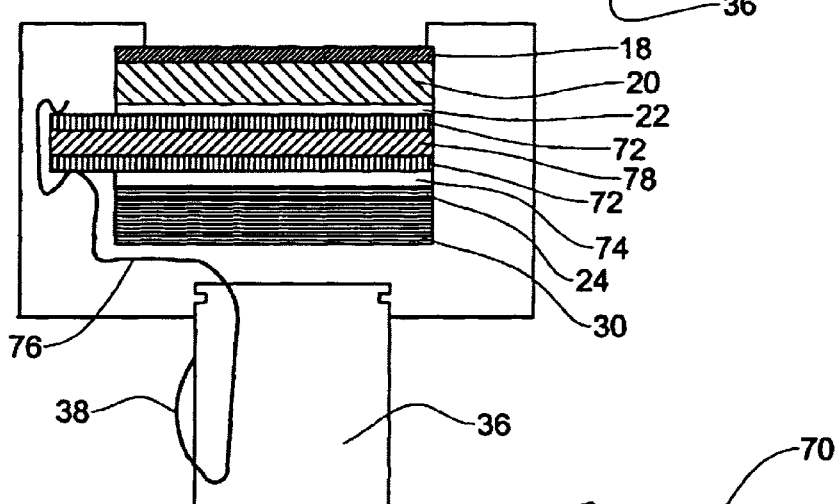
Figure 10:
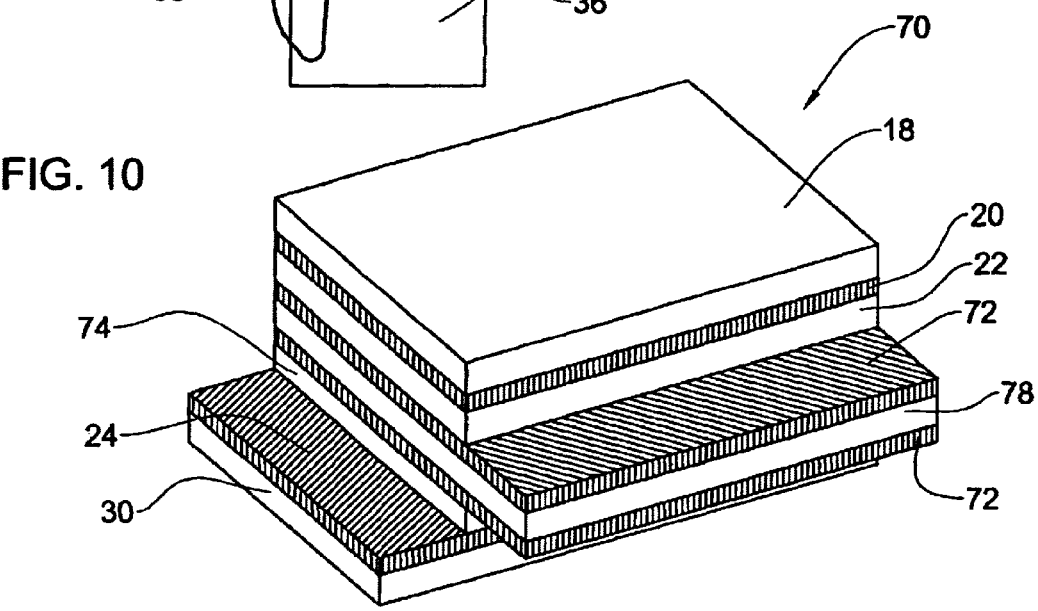
FIG. 10 is a schematic isometric view of the layered structure of a double active layer pixel unit, constructed and operative according to the teachings of the present invention.

FIG. 9A shows such an arrangement of pixel units 50 which is operative as a color display. The manufactured pixel units of this example are rectangular units which include three independently controllable cells of a given color. By arranging the units in rows of cyclic RGB and by providing a longitudinal shift of 1½ pixel units between adjacent rows, each constituent cell of, for example, a red pixel unit is adjacent to cells of neighboring green and blue pixel units. By providing appropriate multiplexing within an assembly board (not shown), groups of adjacent RGB cells are associated to form a "functional color pixel unit". An example of a functional color pixel unit is identified by a thickened border and designated 62.

The pixel unit illustrated has been chosen to be rectangular since this represents a particularly attractive design choice for case of assembly. However, it will be appreciated that the present invention could equally be implemented with pixel units of various different geometries. In particular, a hexagonal pixel unit may provide certain advantages of symmetry. Also of significance is the possibility of a pixel unit featuring a linear array of cells. In the latter case, functional color pixels may simply be defined as corresponding cells in three such pixel units positioned in parallel juxtaposition.

Turning finally to FIGS. 10–13, these illustrate the structure and operation of a valiant pixel unit, generally designated 70, in which multiple, in this case two, active layers are used one in front of the other. Specifically, pixel unit 70 may be viewed as a variant of pixel unit 10 shown in FIG. 2 in which an intermediate transparent conductor 72 and a second active layer 74 containing liquid-crystal-type molecules are interposed between active layer 22 and rear conductive layer 24. A third electrical connector 76, in electrical contact with intermediate transparent conductor 72, extends to the rear portion of the pixel unit. The connections and circuitry of assembly board 12 are modified accordingly.

Intermediate transparent conductor 72 may again take any of the forms mentioned above for conductors 20 and 24. In the case that a thin coating is used, the conductor is implemented as a coating on one or both surfaces of an additional transparent substrate 78, as shown.

Active layers 22 and 74 may be similar or dissimilar in composition, color, thickness, or any other properties, depending upon the desired functionality. By way of example, three possible applications of pixel unit 70 will now be described.

In the simplest application the two active layers may be identical and operated equally and simultaneously by applying the same control voltage across each layer. Typically, outer conductors 20 and 24 are maintained at ground while an elevated voltage is applied to the inaccessible intermediate conductor 72. The contacts for the outer conductors may be shorted within pixel unit 70, or may be achieved by the circuitry within assembly board 12 or externally. This application achieves a double elective thickness of the active layer which can be employed for any given operating voltage.

Figure 12:
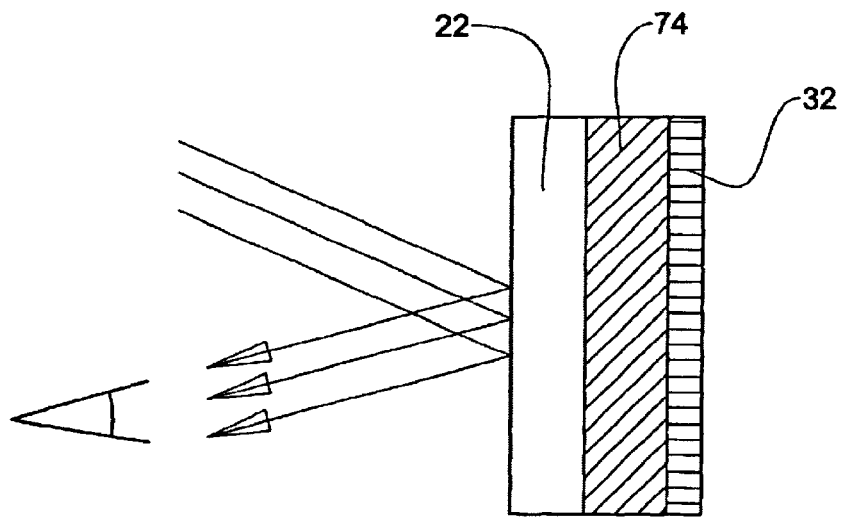
FIG. 12 is a schematic functional representation of one application employing the pixel unit of FIG. 10.
Figures 13A, 13B:
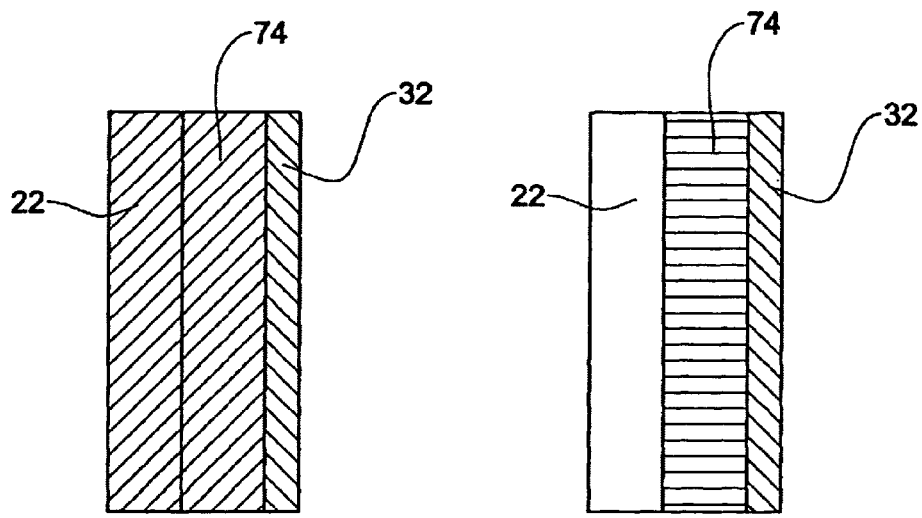
FIGS. 13A and 13B are views similar to FIG. 12 showing two extreme states of the pixel unit.

In a second application, illustrated in FIGS. 12 and 13, alternate activation of the active layers is used. This can readily be achieved by supplying fixed maximum and minimum voltages to the front and rear conductors, respectively, and adjusting the supply to the intermediate conductor within this age. In the example illustrated, first active layer 22 is implemented as uncolored PDLC adjustable between a white scattering state and a clear state, while second active layer 74 is implemented as PDLC containing a black dye. Backing material 32 is implemented as a mirror. The two extreme states of this application are shown in FIGS. 13A and 13B. In a first state of FIG. 13A, the full field is applied across the front active layer such that layer 22 is clear and layer 74 is in its scattering state which is rendered black by the contained dye. When the voltage is switched so that the fill field is applied across the second active layer 74, layer 22 turns to its white scattering state while layer 74 turns clear. In this state, the presence of rear mirror backing 32 greatly enhances the proportion of light reflected outwards by pixel unit 70 compared to a single layer PDLC pixel with a fixed black backing.

Finally, the full versatility of a multiple active layer pixel unit can clearly be achieved by providing independent control of the state of each layer. For example, by providing multiple active layers with different colors in their reflective states, a single pixel unit may be switched between the various colors, or the colors can be combined to form intermediate colors It will be appreciated that the above descriptions are intended only to serve as examples, and that many other embodiments are possible within the spirit and the scope of the present invention.

What is claimed is:

1. A front-lit display panel comprising:
   (a) a plurality of pixels units, each pixel unit having:
       (i) a layered structure including a sequence of: a transparent conductor, an active layer containing liquid-crystal-type molecules, and a rear conductive layer, parts of said pixel unit which lie on a side of said rear conductive layer remote from said active layer being designated as the "rear portion" of said pixel unit,
       (ii) a first electrical connector in electrical contact with said rear conductive layer and extending to the rear portion of said pixel unit, and
       (iii) a second electrical connector in electrical contact with said transparent conductor and extending to the rear portion of said pixel unit; and
   (b) an assembly board for receiving said plurality of pixel units at a plurality of pixel receiving positions arranged in a two-dimensional array, each pixel receiving position having at least two contacts adapted for making electrical contact with said first and second electrical connectors of one of said pixel units.

2. The display panel of claim 1, wherein said active layer contains a colored dye.

3. The display panel of claim 1, further comprising a colored filter positioned in front of said transparent conductor.

4. The display panel of claim 1, wherein said active layer includes PDLC material.

5. The display panel of claim 1, wherein said active layer includes chiral nematic liquid crystal material.

6. The display panel of claim 1, wherein said assembly board has a plurality of sockets, one of said sockets being located at each of said pixel receiving positions, and wherein the rear portion of each pixel unit includes a projection shaped for engaging one of said sockets.

7. The display panel of claim 4, wherein said first and second connectors include connecting strips associated with at least one external surface of said projection.

8. The display panel of claim 1, wherein said rear conductive layer is transparent and wherein the rear portion of said pixel unit includes black backing material.

9. The display panel of claim 1, wherein said plurality of pixel units includes a first group of pixel units in which said active layer assumes a relatively high reflectivity state in which a first color is reflected, a second group of pixel units in which said active layer assumes a relatively high reflectivity state in which a second color is reflected, and a third group of pixel units in which said active layer assumes a relatively high reflectivity state in which a third color is reflected.

10. The display panel of claim 1, wherein one of said transparent conductor and said rear conductive layer is subdivided into a plurality of discontinuous regions, each of said regions being provided with a separate electrical connector in electrical contact with said region and extending to the rear portion of said pixel unit.

11. The display panel of claim 10, wherein said regions are arranged in a two dimensional array, one of said dimensions corresponding to two of said regions.

12. The display panel of claim 1, wherein said layered structure of each of said pixels farther includes:
    (a) an intermediate transparent conductor and a second active layer containing liquid-crystal-type molecules, said intermediate transparent conductor and said second active layer being located between said first-mentioned active layer and said rear conductive layer, and
    (b) a third electrical connector in electrical contact with said intermediate transparent conductor and extending to the rear portion of said pixel unit.

13. A front-lit color display panel comprising a plurality of pixels units, each pixel unit having a layered structure including a sequence of: a transparent conductor, an active layer containing stabilized chiral nematic liquid crystal, and a rear conductive layer, and wherein said plurality of pixel units includes a first group of pixel units in which said stabilized chiral nematic liquid crystal assumes a reflective state in which a first color is reflected, a second group of pixel units in which said stabilized chiral nematic liquid crystal assumes a reflective state in which a second color is reflected, and a third group of pixel units in which said stabilized chiral nematic liquid crystal assumes a reflective state in which a third color is reflected.

14. The display panel of claim 13, wherein said rear conductive layer is transparent, and wherein the rear portion of said pixel unit includes black backing material.

15. The display panel of claim 13, wherein one of said transparent conductor and said rear conductive layer is subdivided into a plurality of discontinuous regions, each of said regions being provided with a separate electrical connector in electrical contact with said region and extending to the rear portion of said pixel unit.

16. The display panel of claim 15, wherein said pixel units are arranged such that each of said regions of a pixel unit of said first group is adjacent to one of said regions of a pixel unit from each of said second and third groups.

17. A front-lit color display panel comprising a plurality of pixels units, each pixel unit having a layered stricture including a sequence of a filter, a transparent conductor, an active layer containing liquid-crystal-type molecules, and a rear conductive layer, and wherein said plurality of pixel units includes a first group of pixel units in which said filter is selectively transparent to a first color, a second group of pixel units in which said filter is selectively transparent to a second color, and a third group of pixel units in which said filter is selectively transparent to a third color.

18. A front-lit color display panel comprising a plurality of pixels units, each pixel unit having a layered structure including a sequence of a transparent conductor, an active layer containing liquid-crystal-type molecules and a dye, and a rear conductive layer, and wherein said plurality of pixel units includes a first group of pixel units in which said dye produces a reflective state in which a first color is reflected, a second group of pixel units in which said dye produces a reflective state in which a second color is reflected, and a third group of pixel units in which said dye produces a reflective state in which a third color is reflected.

19. A front-lit display, for use with a front-lit display panel, comprising a layered structure including a sequence of: a transparent conductor, a first active layer containing liquid-crystal-type molecules, and intermediate transparent conductor, a second active layer containing liquid-crystal-type molecules, and a rear conductor assembly including a mirror element; and the structure is characterized by having respective electrical connector interface elements capable of discrete electrical contact with predetermined electrical conductors of an assembly board.

20. The display of claim 19, wherein said second active layer assumes a substantially black scattering state.

* * * * *